G. WILLIAMSON.
CHUCK.
APPLICATION FILED MAR. 6, 1920.

1,391,441.

Patented Sept. 20, 1921.
2 SHEETS—SHEET 2.

Inventor
George Williamson,
By Dodge and Sons,
Associate Attorneys.

UNITED STATES PATENT OFFICE.

GEORGE WILLIAMSON, OF OLDHAM, ENGLAND.

CHUCK.

1,391,441.  Specification of Letters Patent.  Patented Sept. 20, 1921.

Original application filed January 13, 1917, Serial No. 142,210. Divided and this application filed March 6, 1920. Serial No. 363,793.

*To all whom it may concern:*

Be it known that I, GEORGE WILLIAMSON, a subject of the King of Great Britain, residing at Oldham, in the county of Lancaster, in the Kingdom of England, have invented certain new and useful Improvements in Chucks, of which the following is a specification.

This invention relates to chucks and the like rotary work or tool holders applicable for use in connection with work centering apparatus, or for use in connection with holding an object to cause it to be rotated as with a mandrel of a lathe, or for other purposes.

Scroll chucks wherein the jaws are made to advance toward or recede from the center to an equal extent, while serving their purpose very well, possess the disadvantage that the use of scrolls together with bevel wheels and pinions add considerably to the cost of the chuck, and the present invention has been designed to provide an efficient chuck or work holder wherein the use of these scrolls is avoided, and the motion of the jaws is effected by other means.

The invention will be understood from the following description reference being had to the accompanying drawings, in which:—

Figure 1:
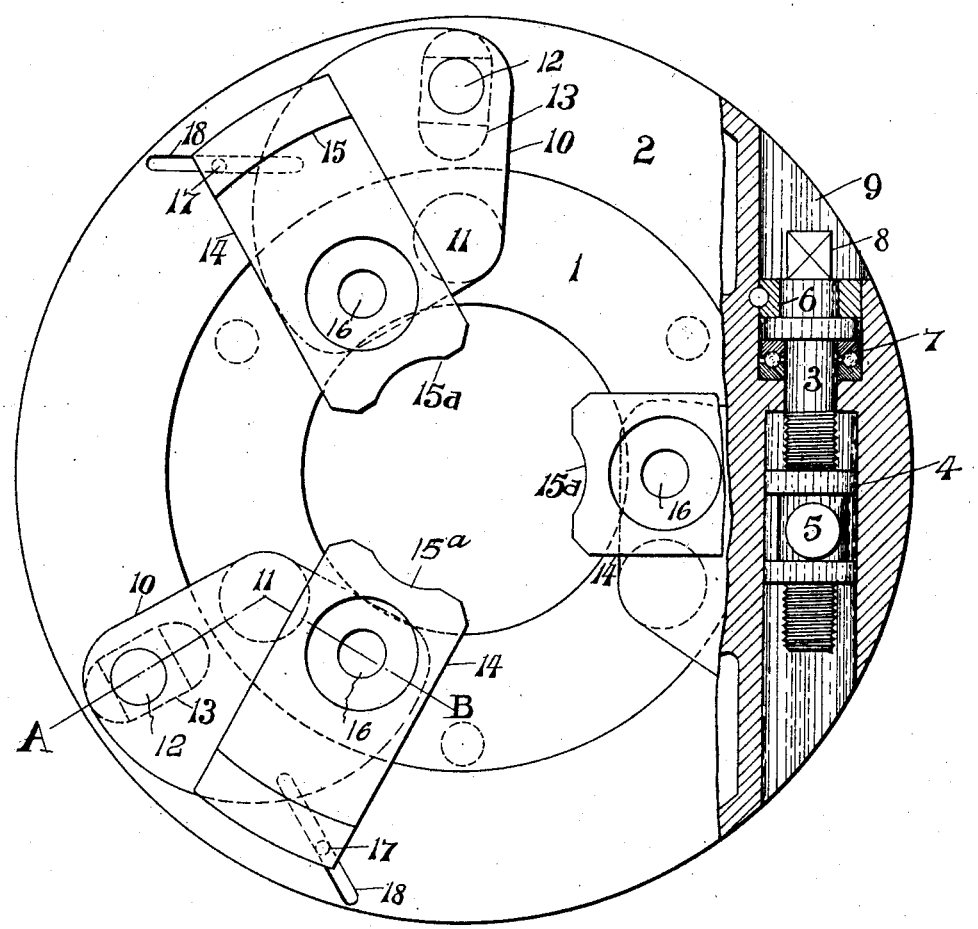
Figure 1 is a front view of the chuck, part of which however is a sectional elevation.
Figure 2:
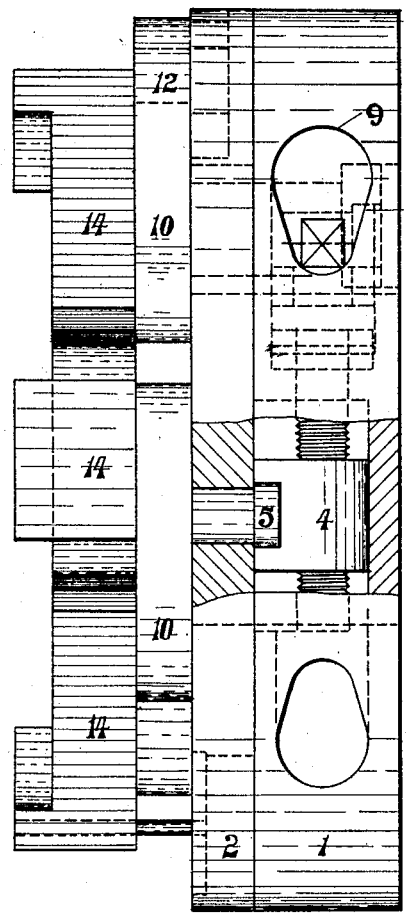
Fig. 2 is a side elevation, part of which is in vertical cross section.

Referring to these drawings the chuck body 1 is provided with a ring 2 which is capable of being turned through the segment of a circle by means of a screwed spindle 3 engaging a nut 4 engaging the squared head of a pin 5 projecting from the ring 2. This screwed spindle 3 is journaled at 6 in the chuck body 1, and operates against ball bearing washers 7 to resist end thrust. The spindle is operated by a box key adapted to engage the squared end 8 of the spindle which lies in a recess 9 in the chuck body so as not to project therefrom, and the ring 2 is recessed into the face of the chuck body 1 so as to lie flush therewith. Arranged around the axial center line of the chuck, are three or any suitable number of carrier members 10 spaced apart. These are each mounted on a separate pin 11 secured to the front of the chuck body 1 at such a distance from the chuck axis, that collectively the ring 2 encircles the said pivot pins 11, and these carriers 10 which may be triangular in form are each coupled to the ring 2 by pins 12 on the carriers engaging slots 13 in the ring, so that the turning of the ring 2 in one direction or the other will oscillate the carriers 10 on their pivot pins 11. At another place each carrier 10 carries a work engaging jaw 14, and by turning the ring 2 by means of the box spanner, the jaws 14 are adjusted with relation to each other and to the axis of the chuck to engage work of different sizes. These jaws 14 may be of various kinds according to the work to be performed. In the case of holding an object so that it can be rotated by the mandrel of a lathe or other machine the jaws may be made in stepped form 15 to enable them to take hold of pieces of work, the diameter of which varies considerably. Consequently by turning the ring 2 while the body of the chuck is at rest, the carriers 10 are oscillated in one direction or the other on their pivots 11, and the jaws are all made to advance toward or recede from the center to an equal extent.

The work engaging jaws are carried on pivots 16, projecting from the carriers 10, and in order to keep the said jaws radial with the center of the chuck body, *i. e.* prevent them assuming a skew-wise position, they are each provided with a rearwardly projecting pin 17 entering an inclined slot 18 in the ring. By making them inclined, the jaws when advanced toward or receded from the center by the turning of the ring, are held in the true radial position, the outer end of the slot 18 advancing toward the pin 17 when the ring is turned one way, and retreating from the pin when turned the other way. If desired the jaws may consist of members having concave recesses 15$^a$ cut in them at different points in their edges, each concave recess being curved to a different radius, or shaped differently so as to fit or engage work of different forms and sizes. These members being pivoted on the carriers, they can be turned into a position to present any of their recesses to the work which is to be gripped. Other types of jaws can however be used and applied to the carriers. These jaws are interchangeable so that by dismounting one type of jaw from the carriers, and substituting another type of jaw, almost any kind of work (or even tools) can be fixed in the chuck, and the diameter of the work to be held, can vary within very wide limits.

Figure 3:
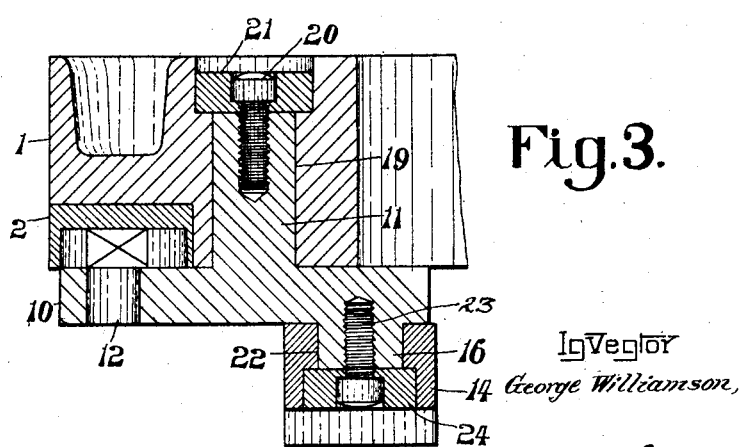
Fig. 3 is a cross-section on the line A B of Fig. 1.

The pivot pins 11 on which the carriers 10 oscillate, consist of trunnions which enter spigot fashion into bored holes 19 in the chuck body, and are prevented from coming out by set screws 20 screwed into the end of the trunnions 11 from the rear of the chuck, the heads on the set screws being recessed into washers 21 bearing against shoulders at the rear of the bored holes, Fig. 3. In like manner the pivots 16 consist of trunnions which enter spigot fashion into bored holes 22 in the work engaging jaws 14, and the jaws are prevented from coming off the trunnions 16 by set screws 23 screwed into the end of the trunnions from the front of the chuck, the heads of the set screws being recessed into washers 24 bearing against shoulders at the front of the bored holes 22.

While I have herein described the preferred forms of carrying the invention into effect, yet I do not desire to limit myself to such preferred details of construction, but claim the right to use any or all modifications thereof which will serve for carrying into effect the objects to be attained by this invention, in so far as such modifications and changes may fall within the spirit and scope of the invention hereinbefore referred to.

This application is a division of my co-pending application Serial No. 142,210, filed January 13, 1917.

I declare that what I claim is:—

1. In a device for the purposes mentioned, the combination of a chuck body, a revoluble ring mounted thereon, carrier members mounted on pivot pins secured to the front of the chuck body, work or tool engaging or work centering jaws mounted on the carriers, means for so coupling the carriers to the ring that the turning of the ring will oscillate the carriers and adjust the jaws with relation to each other, and to the axis of the chuck body, and means for keeping the jaws radial, such means comprising projecting pins engaging slots so arranged in connection with the ring that the outer end of the slots advance toward the pins when the ring is turned one way and retreat from the pins when the ring is turned the other way.

2. In a device for the purpose mentioned, the combination of a chuck body, a revoluble ring mounted thereon, carrier members mounted on pivot pins secured to the front of the chuck body; work (or tool) engaging or work-centering jaws mounted on the carriers; pins for so coupling the carriers to the ring that the turning of the ring will oscillate the carriers and adjust the jaws with relation to each other and to the axis of the chuck body, and means for maintaining the jaws in radial position.

In witness whereof, I have hereunto signed my name this 11th day of February 1920, in the presence of two subscribing witnesses.

GEORGE WILLIAMSON.

Witnesses:
CHARLES PORTER RODWELL,
EWALD SIMPSON MOSELEY.